United States Patent

Greene et al.

[11] Patent Number: 5,986,582
[45] Date of Patent: Nov. 16, 1999

[54] HELICOPTER ROTOR/ENGINE WARNING SYSTEM

[75] Inventors: Leonard M. Greene, White Plains, N.Y.; Randall A. Greene, Boulder, Colo.

[73] Assignee: Safe Flight Instrument Corporation, White Plains, N.Y.

[21] Appl. No.: 09/103,521

[22] Filed: Jun. 24, 1998

[51] Int. Cl.[6] .................................................. G08B 23/00
[52] U.S. Cl. .......................... 340/965; 340/946; 340/945; 340/963; 340/964; 340/966; 340/968; 340/969; 340/970; 340/971; 340/973
[58] Field of Search .................... 340/946, 945, 340/963, 964, 965, 966, 967, 968, 969, 970, 971, 973

[56] References Cited

U.S. PATENT DOCUMENTS

| | | | |
|---|---|---|---|
| 2,566,409 | 9/1951 | Greene | 340/965 |
| 2,748,372 | 5/1956 | Bunds, Jr. | 340/966 |
| 2,754,505 | 7/1956 | Kenyon | 340/965 |
| 2,827,621 | 3/1958 | Reichert et al. | 340/965 |
| 2,964,744 | 12/1960 | Greene | 340/965 |
| 4,115,755 | 9/1978 | Cotton | 340/946 |
| 4,195,802 | 4/1980 | Gilson et al. | 244/17.13 |
| 4,333,070 | 6/1982 | Barnes | 340/439 |
| 4,590,475 | 5/1986 | Brown | 340/966 |
| 4,863,120 | 9/1989 | Zweifel et al. | 244/175 |
| 5,051,918 | 9/1991 | Parsons | 73/117.2 |
| 5,203,563 | 4/1993 | Loper, III | 273/148 B |
| 5,282,181 | 1/1994 | Entner et al. | 368/73 |
| 5,590,853 | 1/1997 | Greene | 244/184 |
| 5,825,297 | 10/1998 | Mooney et al. | 340/825.46 |

*Primary Examiner*—Benjamin C. Lee
*Attorney, Agent, or Firm*—Dougherty & Troxell

[57] ABSTRACT

A two-stage alarm for a rotary wing aircraft, such as a helicopter which operates on a collective control arm. A moveable mass or weight is operatively connected to the collective control arm. The moveable weight may be of a reciprocating type or a rotor driven mass which is mounted eccentrically for rotation about an axs which is spaced from the center of gravity of the weight. In the latter case, a D.C. motor spins the weight rapidly about the axis at a first speed to produce a shaking action to the collective control arm as a warning of an approaching danger. The weight is moved more rapidly to produce a much more noticeable action at a second frequency, or at an increased amplitude as a warning of a more imminent or serious condition which requires immediate action.

15 Claims, 3 Drawing Sheets

HELICOPTER ROTOR/ENGINE WARNING SYSTEM

FIELD OF THE INVENTION

This invention relates to an aircraft control system and more particularly to a tactile warning system for alerting a pilot of dangerous and/or near dangerous conditions.

BACKGROUND FOR THE INVENTION

Control column shakers or stick shakers for fixed-wing aircraft are well known for unmistakably relaying advance warning of an impending stall. Such shakers have been adapted for use on high performance and other aircraft. They are typically mounted on the aircraft's control column. These units electrically provide a high amplitude, low frequency buffet signal to a pilot. Such signals cannot be confused with other warnings and provide a pilot with a reliable stall warning. Control column shakers of various designs are presently manufactured and sold by Safe Flight Instrument Corporation of White Plains, N.Y., the assignee on the present invention.

The uses of control column shakers in rotary wing aircraft have also been disclosed, as in U.S. Pat. No. 4,115,755 to Cotton. As disclosed therein, an alarm, such as a shaking of the collective pitch control lever of a helicopter, is used as an indication that the actual acceleration exceeds the permissible acceleration. As disclosed by the Cotton patent, the structural envelope of the aircraft, as defined by weight, air speed, rotor rpm, air density and collective stick position, is used as an indication of permissible loading of a helicopter rotor. Cotton also teaches the use of a gross measure of the aircraft weight, density of the air, air speed, the collective pitch and rotor speed of the aircraft as indices of a table look-up to determine the maximum permissible aircraft acceleration under such flight conditions which is then compared against the actual aircraft acceleration to determine when the aircraft is maneuvered close to a loading which exceeds a structural envelope.

SUMMARY OF THE INVENTION

It is presently believed that there is a significant demand for an improved collective control shaker in accordance with the present invention. It is believed that there is a significant demand for a two-stage tactile warning system which alerts a pilot that he/she is approaching a dangerous condition and then warns the pilot when immediate corrective action should be taken. With this approach, the pilot can fly the aircraft close to its critical limitations and at the same time take corrective action when it becomes necessary.

The collective control shaker in accordance with the present invention provides a first sensory warning when the aircraft is close to a relatively critical stage with respect to any one of a number of flight conditions. For example, as the aircraft approaches a dangerous condition, the shaker vibrates the collective control at a first frequency or amplitude to alert the pilot to either push the collective in a downward direction, or to at least be prepared to do so. Then if any one of a number of flight characteristics becomes more critical, the shaker produces a more violent shaking to provide a vigorous sensory signal to indicate the need for immediate action.

The tactile warning system in accordance with the present invention enables a pilot to fly a helicopter safely at maximum loading within its structural envelope. The system provides an alert signal, such as a vibration of the collective control at a first frequency or amplitude when any one of several operating parameters reaches a first preselected level. The system then provides a more noticeable signal, such as a violent shaking, which overrides the first signal when any one of several parameters becomes critical. The operating parameters may include engine torque, exhaust gas temperature, rotor speed, turbine output shaft speed, turbine inlet temperature, etc.

In addition, the tactile warning system in accordance with the present invention is durable, reliable and can be manufactured, installed and serviced at a competitive cost.

In essence, the present invention contemplates a two-stage alarm for a rotary wing aircraft, such as a helicopter. The alarm operates on a collective control arm of the type used in the control of helicopters. A moveable mass or weight is operatively connected to the collective control arm as, for example, by being mounted thereon or bolted thereto. The moveable weight may be of a reciprocating type or a rotary driven mass which is mounted eccentrically, i.e. for rotation about an axis which is spaced from the center of gravity of the weight. In the latter case, means such as a D.C. motor spins the weight rapidly about the axis at a first speed to produce a shaking action to the collective control arm as a warning of an approaching danger. Means are also provided for moving the weight more rapidly, as for example by a higher voltage, to produce a much more noticeable action at a second frequency, or at an increased amplitude as a warning of a more imminent or serious condition which requires immediate action.

A tactile warning system in accordance with a preferred embodiment of the invention includes a collective control arm and a shaker mechanism operatively connected to the collective control arm. The shaker mechanism may be mounted on, bolted or otherwise fixed to the collective control arm. The system also includes means for sensing a first pre-selected flight condition which is indicative of an approaching danger and a second pre-selected flight condition which is indicative of a more imminent danger and means for producing first and second signals in response to the sensed conditions. The shaker mechanism includes means for producing a first level of sensory perception in response to the first of the signals and a second level of sensory perception which overrides the first level of sensory perception in response to the second signal. In this way, a pilot is warned that he/she is operating a helicopter near a dangerous condition and then given a second warning when the condition becomes critical. The invention will now be described in connection with the following drawings wherein like reference numerals have been used to indicate like parts.

DESCRIPTION OF THE PREFERRED EMBODIMENTS OF THE INVENTION

Figure 1:
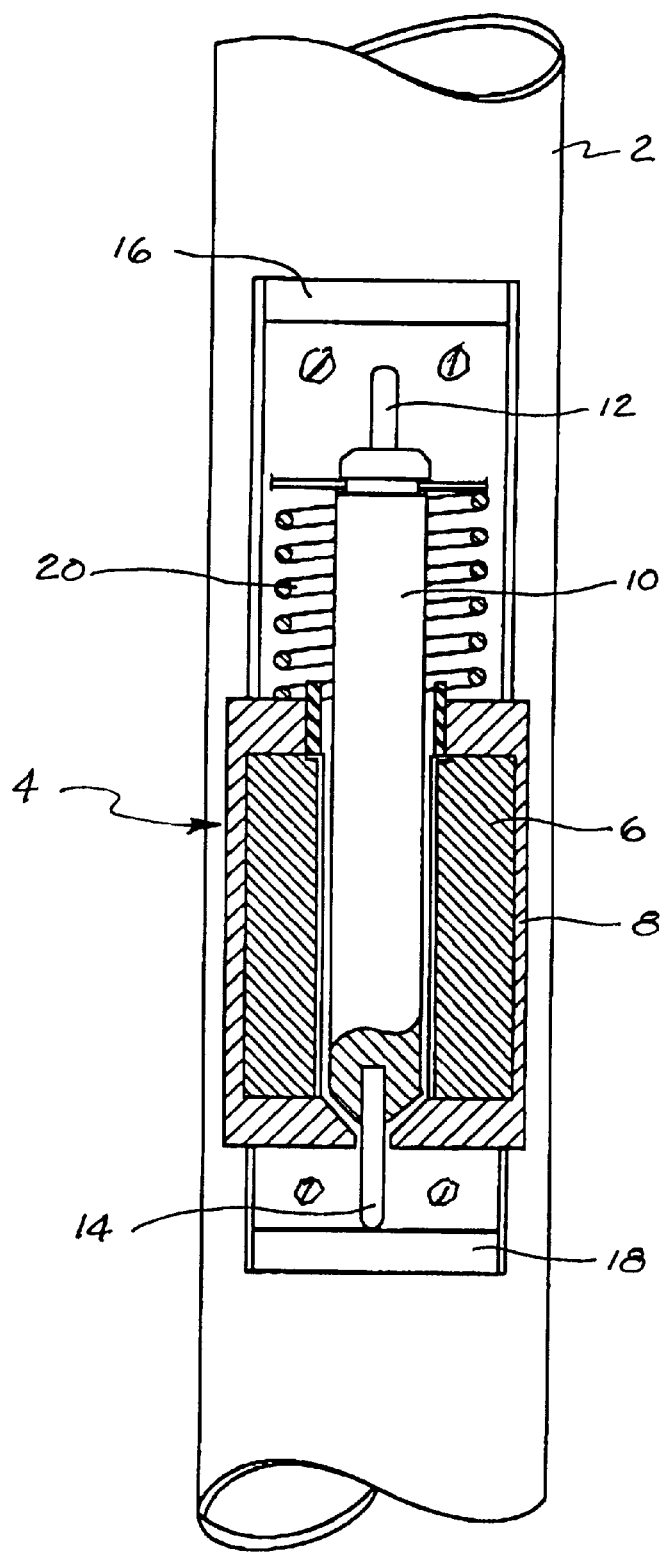
FIG. 1 is a top view of a helicopter collective control arm in accordance with one embodiment of the invention wherein a reciprocating shaker is shown in cross-section.

As shown in FIG. 1, a helicopter collective control arm 2 which is of conventional design and as used in the control of the collective pitch of a helicopter includes a reciprocating shaker mechanism 4 mounted on the arm 2, such as on the top thereof The shaker mechanism may be bolted to the top of the arm 2, held thereon by threaded fasteners (not shown), or attached thereto in any other conventional manner.

The reciprocating mechanism 4 comprises an alternating solenoid which includes a solenoid coil 6, magnetic circuit 8 and shuttlecock or plunger 10. Strikers 12 and 14 are disposed one on each end of the plunger 10 and are adapted to strike end plates 16 and 18 as the plunger moves back and forth within the solenoid coil 6. The plunger 10 which is shown in its energized position is biased in the opposite direction by a coil spring 20 so that the striker 12 will strike the end stop 16 when the solenoid is de-energized.

Figure 2:
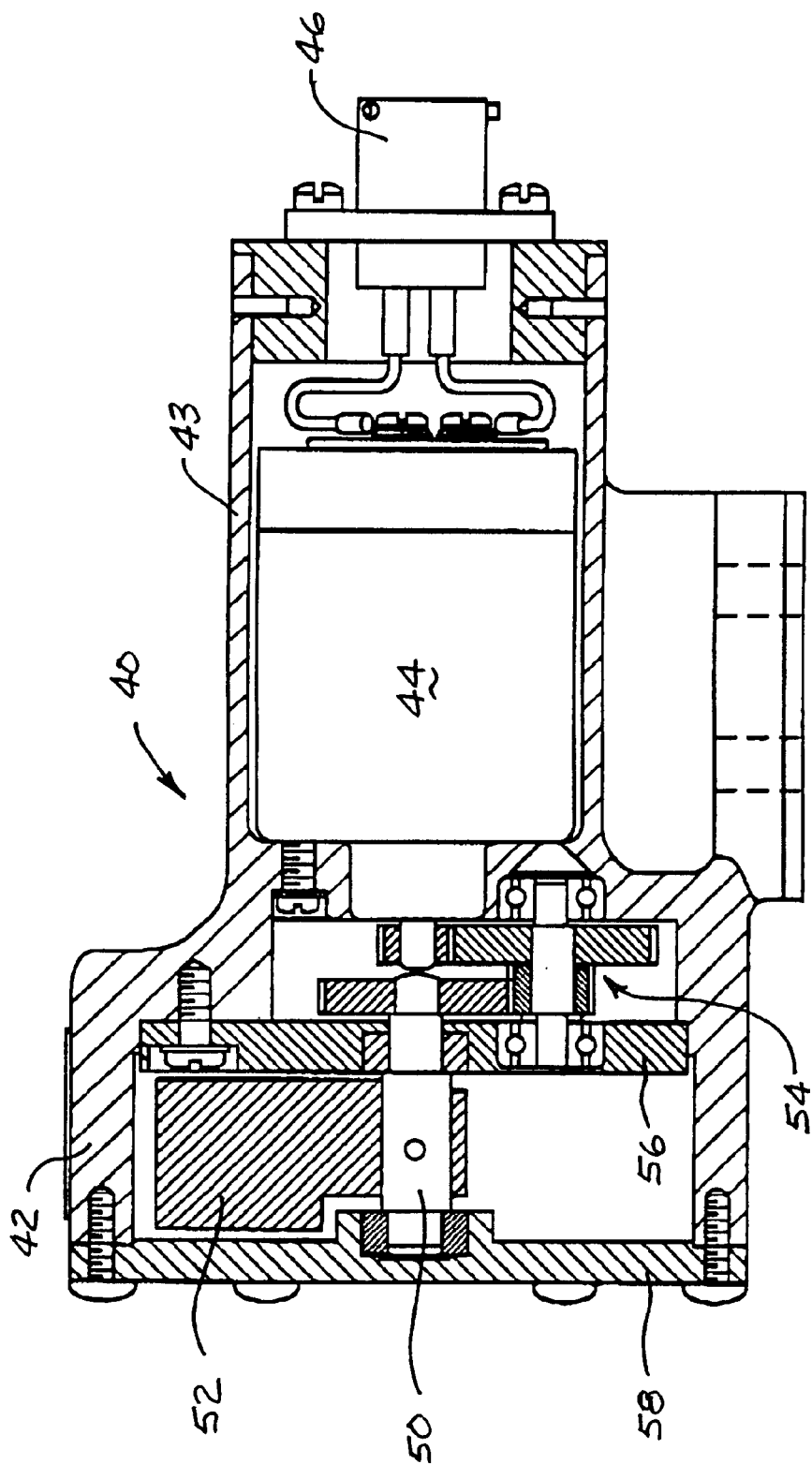
FIG. 2 is a top view of a helicopter collective control arm in accordance with a preferred embodiment of the invention wherein a rotary shaker is shown in cross section: and, FIG. 3 is a schematic diagram which illustrates the sensing of the flight characteristics in the operation of the invention.

A second embodiment of the invention incorporates a conventional stick shaker mechanism of a type manufactured by Safe Flight Instrument Corporation of White Plains, N.Y. and identified as a side-mounted shaker. As shown in FIG. 2, the shaker mechanism 40 includes a generally cylindrical housing having a forward portion 42 and rear portion 43. As illustrated, the forward portion 42 has a larger diameter than the rear portion 43. A D.C. motor 44 is disposed in the rear portion 43 and is generally coaxial therewith. The rear portion 43 also includes a connector 46 for connecting the motor 44 to a source of power or energy (not shown). A shaft 50 and an eccentric weight 52 which is mounted on the shaft 50 are disposed in the forward portion 42 of the housing. The eccentric weight 52 is keyed to the shaft 50 and rotated by the motor 44 through a gear train assembly 54. The gear train assembly 54 is separated from the eccentric weight and shaft by partition 56 which includes conventional bushing assemblies to rotatably support one end of shaft 50 and the gear train shaft. The forward portion 41 of the housing 42 is then closed by an end cap 58.

Figure 3:
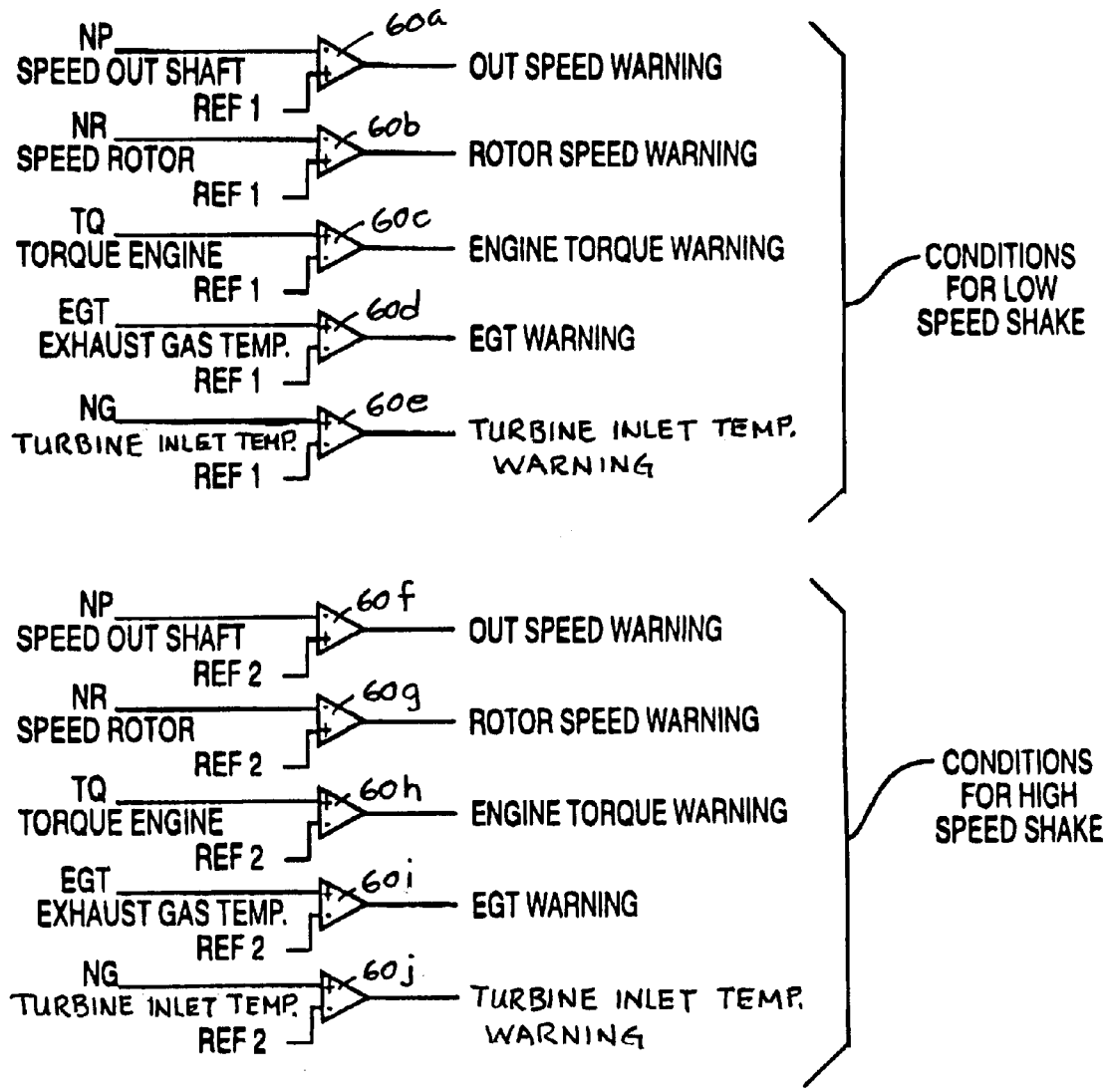

The reciprocating mechanism 4 and the shaker mechanism 40 are controlled in response to a plurality of operating parameters, such as output shaft speed, rotor speed, engine torque, exhaust gas temperature and turbine inlet temperature. As illustrated in FIG. 3, known sensors monitor these parameters and compare them to a first reference value, REF 1, and a second reference value, REF 2, via comparators 60a–60j. Should any sensed parameter exceed the first reference value, REF 1, the comparator will transmnit a first signal which will cause the mechanism to reciprocate or rotate to cause the collective control arm to vibrate at a first frequency or amplitude to warn the pilot of the approach of a potentially dangerous operating condition. Should any sensed parameter exceed the second reference value, REF 2, a second signal will cause the mechanisms to vibrate the collective control arm at a second, more violent frequency or amplitude to warn the pilot to take immediate corrective action to avoid impending danger.

Although the invention has been described using two reference values, quite obviously more than two reference values may be utilized without exceeding the scope of the invention. It is also within the scope of this invention to utilize different operating parameters to provide the activation signal for the disclosed vibrating mechanisms.

While the invention has been described in connection with its preferred embodiments, it should be recognized and understood that changes and modifications may be made therein without departing from the scope of the appended claims.

What is claimed is:

1. A tactile warning system for a helicopter having a rotor with a plurality rotor blades and a collective pitch adjusting mechanism for collectively adjusting pitches of the rotor blades, the warning system comprising:

a) a movable collective control arm connected to the collective pitch adjusting mechanism whereby movement of the collective control arm collectively adjusts the pitches of the rotor blades;

b) a storage device storing first and second pre-selected values for a plurality of flight characteristics of the helicopter;

c) sensing devices for sensing values of actual flight characteristics of the helicopter corresponding to the flight characteristics in the storage device;

d) a comparator receiving inputs from the storage device and the sensing devices to compare the values of the actual flight characteristics to both the first and second pre-selected values for the plurality of flight characteristics; and, e) a shaker mechanism for shaking the collective control arm, the operation of the shaker mechanism controlled by an output from the comparator such that the shaker provides a first level of tactile sensory perception when any of the values of the actual flight characteristics exceed a corresponding first pre-selected value, and a second level of tactile sensory perception when any of the values of the actual flight characteristics exceed a corresponding second pre-selected value.

2. The tactile warning system according to claim 1 wherein said shaker mechanism includes an eccentrically mounted weight and an electric motor for rotating said eccentrically mounted weight about an axis whereby the inertial rotation of the unbalanced weight produces vibration of the collective control arm.

3. The tactile warning system according to claim 2 in which said electric motor is a D.C. motor and wherein said D.C. motor is operated at a first voltage to provide said first level of sensory perception and at a second voltage to provide said second level of sensory perception.

4. The tactile warning system according to claim 2 in which said electric motor is operated at a first speed to provide said first level of sensory perception and at a second speed to provide said second level of sensory perception.

5. The tactile warning system according to claim 2 in which a frequency of vibration of the collective control arm in the second level of sensory perception is greater than a frequency of vibration for the first level of sensory perception.

6. The tactile warning system according to claim 2 in which said shaker mechanism is mounted on said collective control arm.

7. The tactile warning system according to claim 1 wherein the shaker mechanism includes a weight that is moved in a reciprocating manner.

8. The tactile warning system of claim 1 wherein the first pre-selected values are indicative of an approaching dangerous flight condition, and the second pre-selected values are indicative of an immediate dangerous flight condition.

9. The tactile warning system of claim 1 wherein the storage device stores first and second pre-selected values of engine torque and wherein the sensing device senses actual values of engine torque.

10. The tactile warning system of claim 1 wherein the storage device stores first and second pre-selected values of exhaust gas temperature and wherein the sensing device senses actual values of exhaust gas temperature.

11. The tactile warning system of claim 1 wherein the storage device stores first and second pre-determined values of rotor speed and wherein the sensing device senses actual values of rotor speed.

12. The tactile warning system of claim 1 wherein the storage device stores first and second pre-determined values of output shaft speed and wherein the sensing device senses actual values of output shaft speed.

13. The tactile warning system of claim 1 wherein the storage device stores first and second pre-determined values of turbine inlet temperature and wherein the sensing device senses actual values of turbine inlet temperature.

14. The tactile warning system of claim 1 wherein the storage device stores first and second pre-determined values of engine torque and exhaust gas temperature and wherein the sensing device senses actual values of engine torque and exhaust gas temperature.

15. The tactile warning system of claim 1 wherein the storage device stores first and second pre-determined values of output shaft speed, rotor speed, engine torque, exhaust gas temperature and turbine inlet temperature, and wherein the sensing device senses actual values of output shaft speed, rotor speed, engine torque, exhaust gas temperature and turbine inlet temperature.

* * * * *